United States Patent
Hayaishi

(10) Patent No.: US 7,450,753 B2
(45) Date of Patent: Nov. 11, 2008

(54) COLOR BALANCE ADJUSTMENT CONDUCTED CONSIDERING COLOR REPRODUCIBILITY OF SPECIFIC COLOR

(75) Inventor: Ikuo Hayaishi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 553 days.

(21) Appl. No.: 10/554,174

(22) PCT Filed: Apr. 30, 2004

(86) PCT No.: PCT/JP2004/006353

§ 371 (c)(1),
(2), (4) Date: Oct. 21, 2005

(87) PCT Pub. No.: WO2004/098202

PCT Pub. Date: Nov. 11, 2004

(65) Prior Publication Data
US 2006/0257022 A1    Nov. 16, 2006

(30) Foreign Application Priority Data
May 1, 2003    (JP)    ............... 2003-126140

(51) Int. Cl.
*G06K 9/00* (2006.01)
(52) U.S. Cl. ................ 382/167; 382/274
(58) Field of Classification Search ........ 382/162, 382/165, 167, 274; 358/516, 518, 519, 520; 348/223.1
See application file for complete search history.

(56) References Cited

U.S. PATENT DOCUMENTS

| | | | |
|---|---|---|---|
| 5,282,022 A | 1/1994 | Haruki et al. | |
| 5,644,359 A | 7/1997 | Ito | |
| 6,795,115 B1 | 9/2004 | Okazaki | |
| 6,975,759 B2 * | 12/2005 | Lin | 382/167 |
| 7,146,041 B2 * | 12/2006 | Takahashi | 382/167 |
| 7,265,781 B2 * | 9/2007 | Noguchi | 348/223.1 |

(Continued)

FOREIGN PATENT DOCUMENTS

EP    0 429 992    6/1991

(Continued)

OTHER PUBLICATIONS

Abstract of Japanese Patent Publication No. 03-232391, Pub. Date: Oct. 16, 1991, Patent Abstracts of Japan.

(Continued)

*Primary Examiner*—Phuoc Tran
(74) *Attorney, Agent, or Firm*—Martine Penilla & Gencarella, LLP

(57) ABSTRACT

Color balance correction value is calculated based on an average pixel value of specific color pixels if an average hue of high luminance pixels is not within a predetermined range in the vicinity of a specific chromatic color (for example, skin color). This calculation may additionally use a specific color pixel ratio as well as the average pixel value of the specific color pixels. On the other hand, if the average hue of high luminance pixels is within the predetermined range in the vicinity of a specific chromatic color (for example, skin color), the color balance correction value is calculated using the average pixel value of the plurality of high luminance pixels, without using the average pixel value of the specific color pixels.

10 Claims, 8 Drawing Sheets

U.S. PATENT DOCUMENTS

2002/0018129 A1   2/2002   Ikeda
2003/0001958 A1   1/2003   Hoshuyama

FOREIGN PATENT DOCUMENTS

| EP | 0 429 992 A2 | 6/1991 |
|----|--------------|--------|
| JP | 03-232391    | 10/1991 |
| JP | 2001-069526  | 3/2001 |
| JP | 2001-320727  | 11/2001 |
| JP | 2002-027491  | 1/2002 |
| JP | 2002-315015  | 10/2002 |
| JP | 2002-354498  | 12/2002 |

OTHER PUBLICATIONS

Abstract of Japanese Patent Publication No. 2001-069526, Pub. Date: Mar. 16, 2001, Patent Abstracts of Japan.
Abstract of Japanese Patent Publication No. 2001-320727, Pub. Date: Nov. 16, 2001, Patent Abstracts of Japan.
Abstract of Japanese Patent Publication No. 2002-027491, Pub. Date: Jan. 25, 2002, Patent Abstracts of Japan.
Abstract of Japanese Patent Publication No. 2002-315015, Pub. Date: Oct. 25, 2002, Patent Abstracts of Japan.
Abstract of Japanese Patent Publication No. 2002-354498, Pub. Date: Dec. 6, 2002, Patent Abstracts of Japan.

* cited by examiner

Fig.4

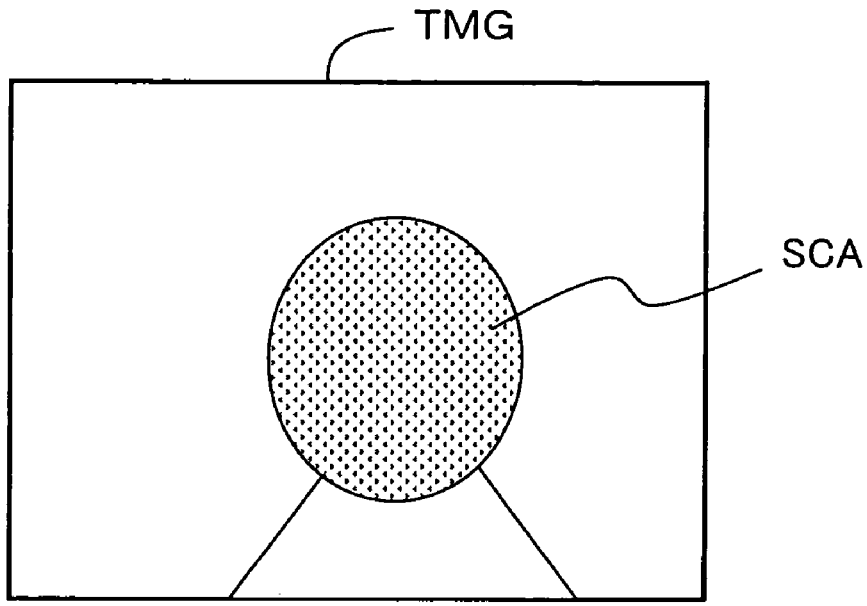

Color Balance Adjustment Parameters
- High luminance pixel average pixel value CB_ave:
    Color component average values: CB_ave(R), (G) and (B)
    Average luminance value: CB_ave(Y)
    Average hue value: CB_ave(H)
- Skin color pixel ratio SPratio:
    SPratio = [skin color pixel count]/[total pixel count]
- Skin color pixel average pixel value SC_ave:
    SC_ave(R), (G), (B)
- Skin color target value SC_target:
    SC_target(R), (G), (B)
- Color balance correction values $\Delta C$:
    $\Delta C(R) = K1 \times \{CB\_ave(Y) - CB\_ave(R)\}$
        $+ k2 \times \{SC\_target(R) - SC\_ave(R)\} \times SPratio$
    $\Delta C(G) = K1 \times \{CB\_ave(Y) - CB\_ave(G)\}$
        $+ k2 \times \{SC\_target(G) - SC\_ave(G)\} \times SPratio$
    $\Delta C(B) = K1 \times \{CB\_ave(Y) - CB\_ave(B)\}$
        $+ k2 \times \{SC\_target(B) - SC\_ave(B)\} \times SPratio$

COLOR BALANCE ADJUSTMENT CONDUCTED CONSIDERING COLOR REPRODUCIBILITY OF SPECIFIC COLOR

TECHNICAL FIELD

This invention relates to technology for adjusting color balance in images.

BACKGROUND ART

Processing known as color balance adjustment can be performed on the entirety of an image taken by an image generation device such as a digital still camera or a video camera (for example, see JP-2001-320727-A).

Color balance adjustment allows for a reduction of color cast in the image, so that photographic subjects that were originally white are correctly reproduced as white.

However, color balance adjustment sometimes results in undesired changes to the colors of specific photographic objects. For example, if near-white pixels have become bluish, color balance adjustment decreases the blue component in the overall image, so that the red component is accentuated. This presents a problem in that, if skin color in the image is at the desired color before color balance adjustment, the skin color will become more red, which is to say that the color will be less desirable. This problem of changing a desired color to a less desirable color as a result of color balance adjustment is not limited to skin color, but may also occur for other chromatic colors such as green and blue, and is, in general, a common problem for specific chromatic colors.

DISCLOSURE OF THE INVENTION

An object of the present invention is to provide technology capable of mitigating the phenomenon wherein color balance adjustment has the opposite effect of shifting a color close to a specific chromatic color in an image away from the desired color.

An image processing device according to an aspect of the present invention is an image processing device for adjusting color balance in an image to be processed, comprising: a specific color pixel ratio calculation module configured to calculate a ratio of specific color pixels having a color within a first predetermined range in the vicinity of a specific chromatic color, from among all of the pixels present in an image to be processed; a specific color pixel average calculation module configured to calculate an average value of pixel values for the specific color pixels; a color balance correction value calculation module having a first computation mode for calculating a color balance correction value based on the specific color pixel ratio and the average pixel value for the specific color pixels; and a color balance adjustment execution module configured to execute the color balance adjustment for the entirety of the image to be processed, using the color balance correction value.

By virtue of this image processing device, the color balance correction value is calculated based on the specific color pixel ratio and the average pixel value of the specific color pixels, whereby it is possible to mitigate the phenomenon wherein color balance adjustment has the opposite effect of shifting a color close to a specific chromatic color in an image away from the desired color as a result.

It is preferable that the color balance correction value calculated in the first computation mode includes a component that increases with increases in a difference between a predetermined specific color target pixel value for the specific chromatic color and the average pixel value for the specific color pixels, and that increases with increases in the specific color pixel ratio.

By virtue of this constitution, it is possible to keep the colors of pixels having a color close to the specific chromatic color at suitable colors.

The image processing device may further comprise: a high luminance pixel average pixel value calculation module configured to calculate an average value of pixel values for a plurality of high luminance pixels which have colors in a predetermined second color range having low-color-saturation and high-luminance, among all of the pixels present in the image to be processed, wherein the color balance correction value calculation module may: (i) execute computations in the first computation mode if the average value of hue values of the plurality of high luminance pixels is not within a predetermined range in the vicinity of the specific chromatic color, and (ii) execute computations in a second computation mode for calculating the color balance correction value using the average pixel value of the plurality of high luminance pixels, without using the specific color pixel ratio and the average pixel value of the specific color pixels, if the average value of the hue values of the plurality of high luminance pixels is within the predetermined range in the vicinity of the specific chromatic color.

By virtue of this constitution, the color balance correction value can be set to a suitable value, according to whether or not the average hue value of the high luminance pixels is within the predetermined range in the vicinity of the specified chromatic color. Specifically, in the first computation mode, pixels having colors in the vicinity of the specific chromatic color can be maintained at suitable colors; and in the second mode, a desirable color balance can be achieved for the entire image to be processed.

Alternatively, in the image processing device, the specific chromatic color may be skin color, and an image data file representing the image to be processed includes photographic scene type information representing a type of photographic scene in the image to be processed, wherein the color balance adjustment execution module may: (i) execute computations in the first computation mode if the photographic scene type information indicates portrait; and (ii) execute computations in a second computation mode for calculating the color balance correction value using the average pixel value of the plurality of high luminance pixels, without using the specific color pixel ratio and the average pixel value of the specific color pixels, if the photographic scene type information indicates a scene other than portrait.

By virtue of this constitution, if the photographic scene type indicates portrait, pixels having colors in the vicinity of skin color can be maintained at suitable colors. Meanwhile, if the photographic scene type indicates a scene other than portrait, a desirable color balance can be achieved for the entire image to be processed.

An image processing device according to another aspect of the present invention is an image processing device for adjusting color balance in an image to be processed, comprising: a specific color pixel average calculation module for calculating an average value for pixel values of specific color pixels having a color within a first predetermined range in the vicinity of a specific chromatic color, from among all of the pixels present in the image to be processed; a color balance correction value calculation module having a first computation mode for calculating a color value correction value based on the average pixel value of the specific color pixels; and a color balance adjustment execution module configured to execute the color balance adjustment for the entirety of the image to be processed, using the color balance correction value.

By virtue of this image processing device, the color balance correction value is calculated based on the average pixel value of the specific color pixels, whereby it is possible to mitigate the phenomenon wherein color balance adjustment has the opposite effect of shifting a color close to a specific chromatic color in an image away from the desired color.

It is preferable that the color balance correction value calculated in the first computation mode includes a component that increases with increases in a difference between a predetermined specific color target pixel value for the specific chromatic color and the average pixel value of the specific color pixels.

By virtue of this constitution, it is possible to keep the colors of pixels having a color close to the specific chromatic color at suitable colors.

The image processing device may further comprise a high luminance pixel average pixel value calculation module configured to calculate an average value of pixel values for a plurality of high luminance pixels which have colors in a predetermined second color range having low-color-saturation and high-luminance, among all of the pixels present in the image to be processed, wherein the color balance correction value calculation module may: (i) execute computations in the first computation mode if the average value of hue values of the plurality of high luminance pixels is not within a predetermined range in the vicinity of the specific chromatic color; and (ii) execute computations in a second computation mode for calculating the color balance correction value using the average pixel value of the plurality of high luminance pixels, without using the average pixel value of the specific color pixels, if the average value of the hue values of the plurality of high luminance pixels is within the predetermined range in the vicinity of the specific chromatic color.

By virtue of this constitution, the color balance correction value can be set to a suitable value, according to whether or not the average value of the hues of the high luminance pixels is within the predetermined range in the vicinity of the specific chromatic color. Specifically, in the first computation mode, pixels having colors in the vicinity of the specific chromatic color can be maintained at suitable colors; and in the second mode, a desirable color balance can be achieved for the entire image to be processed.

Alternatively, in the image processing device, the specific chromatic color may be skin color; and an image data file representing the image to be processed may include photographic scene type information representing a type of photographic scene in the image to be processed; wherein the color balance adjustment execution module may: (i) execute computations in the first computation mode if the photographic scene type information indicates portrait; and (ii) execute computations in a second computation mode for calculating the color balance correction value using the average pixel value of the plurality of high luminance pixels, without using the average pixel value of the specific color pixels, if the photographic scene type information indicates a scene other than portrait.

By virtue of this constitution, if the photographic scene type indicates portrait, pixels having colors in the vicinity of skin color can be maintained at suitable colors. Meanwhile, if the photographic scene type indicates a scene other than portrait, a desirable color balance can be achieved for the entire image to be processed.

Note that the present invention can be carried out in various modes; for example, it may be carried out in such modes as an image processing method and an image processing device, a computer program for implementing the functions of this method or this device, and a recording medium on which this computer program is recorded.

BRIEF DESCRIPTION OF THE DRAWINGS

FIG. 4 is a schematic view illustrating an image to be processed TMG and various color balance adjustment parameters therefor.

BEST MODE FOR CARRYING OUT THE INVENTION

Figure 1:
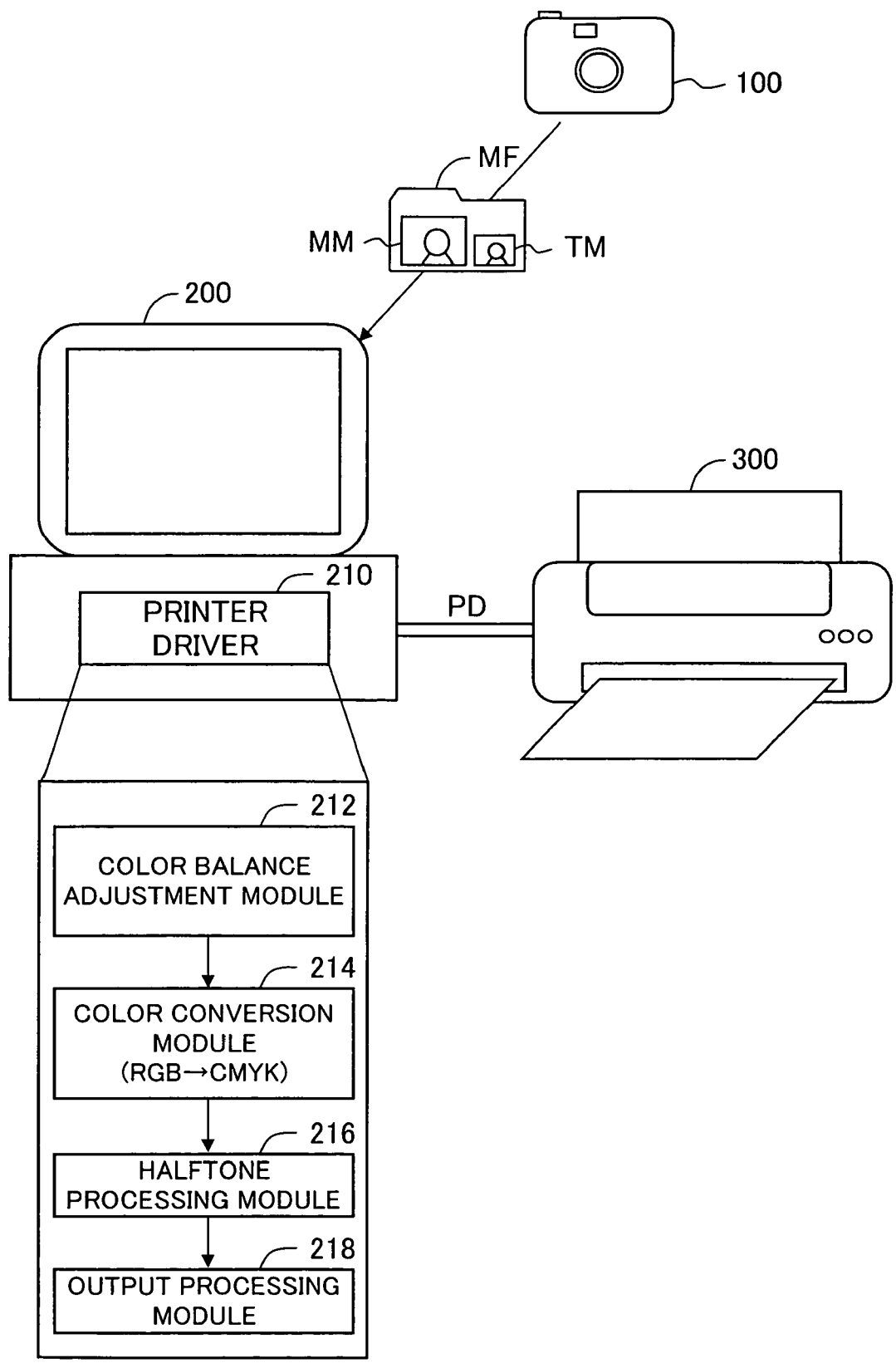
FIG. 1 is a schematic view illustrating the structure of an image processing system according to one embodiment of the present invention.

Preferred embodiments of the present invention are described in the following order:
A. First Embodiment
B. Second Embodiment
C. Variants A. First Embodiment FIG. 1 is a schematic view illustrating the structure of an image processing system according to one embodiment of the present invention. The system comprises a digital camera 100 as an image generation device, a computer 200 as an image processing device and a printer 300 as an image output device. An image data file MF generated by the digital camera 100 is sent to the computer 200 or to the printer 300 for output. Note that, in the present specification the term "output" encompasses display on a monitor and printing.

Figure 2:
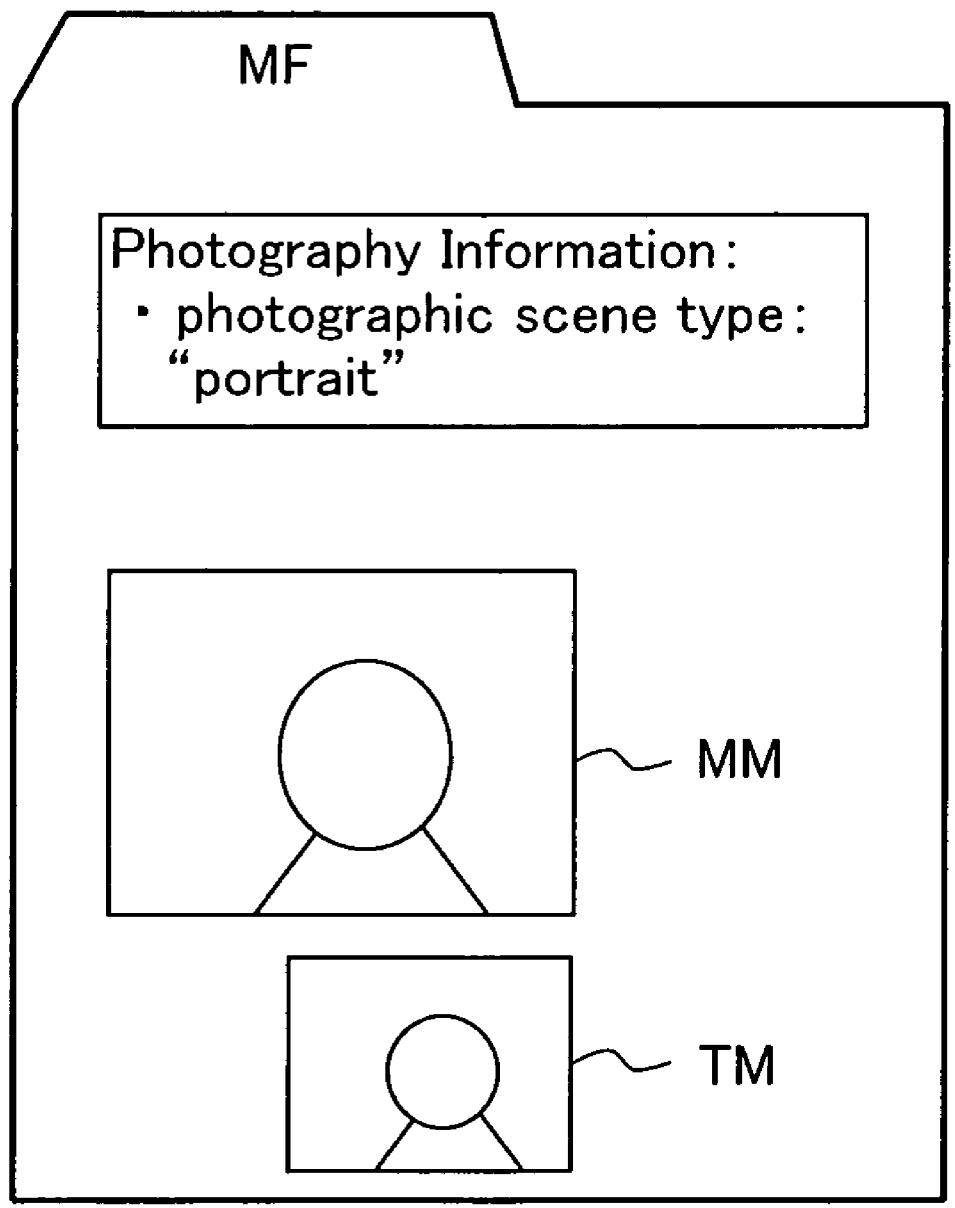
FIG. 2 is a schematic view illustrating the structure of an image data file MF.

FIG. 2 is a schematic view illustrating the structure of the image data file MF. This image data file MF comprises photography information, main image data MM and thumbnail image data TM. The main image data MM and the thumbnail image data TM are usually in a compressed data format (for example JPEG data compression). Note that it is acceptable for the thumbnail image data TM not to be included in the image data file MF.

The photography information includes the various conditions and settings for the time at which the image data file MF was generated by the digital camera 100. In FIG. 2, "photographic scene type" is shown as an example of photography information. The photographic scene type can be set to "portrait," "landscape," "night scene" or the like.

A printer driver 210, which serves to generate printing data based on the image data file MF, is installed on the computer 200 (FIG. 1).

The printer driver 210 comprises a color balance adjustment module 212, a color conversion module 214, a halftone processing module 216, and an output processing module 218. The printing data PD generated by the printer driver 210 is supplied to the printer 300 from the output processing module 218. The printing data PD comprises dot data that indicates the ink dot recording conditions for each pixel in the main scanning line having a printing resolution, and sub-scan feed data that specifies the sub-scan feed amount. Note that the printer driver 210 corresponds to a computer program for realizing the functions that generate dot data for printing. Furthermore, the color balance adjustment module 212 corresponds to a computer program for realizing the functions that perform color balance adjustment.

The program for realizing the functions of the printer driver 210 can be supplied in the form of a program recorded on a computer readable recording medium. Various computer readable media can be used as this recording medium, such as flexible disks and CD-ROMs, magneto optical disks, IC cards, ROM cartridges, punch cards, and printed material on which symbols such as bar codes are printed.

Figure 3:
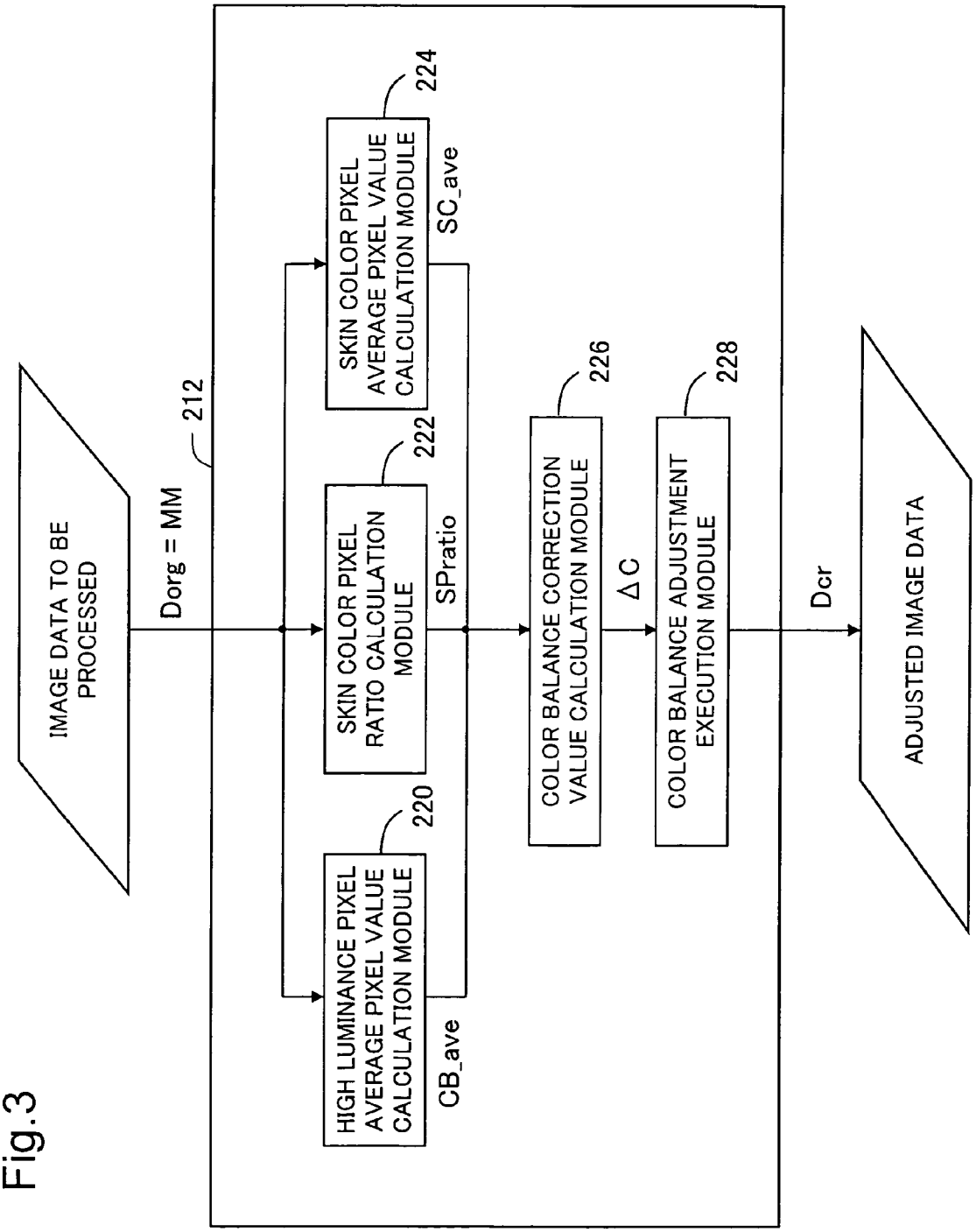
FIG. 3 is a block diagram illustrating the structure of a color balance adjustment module 212.

FIG. 3 is a block diagram illustrating the structure of a color balance adjustment module 212. FIG. 4 is a schematic view illustrating an example of an image to be processed TMG and various color balance adjustment parameters. The color balance adjustment module 212 comprises the following modules.

(1) High Luminance Pixel Average Pixel Value Calculation Module 220:

This module 220 calculates the following average pixel values for high luminance pixels based on the data for the image to be processed Dorg, which corresponds to main image data MM in FIG. 2.
a. Average color component values: CB_ave(R), CB_ave(R), CB_ave(B);
b. Average luminance value: CB_ave(Y); and
c. Average hue value: CB_ave(H)

Figure 5:
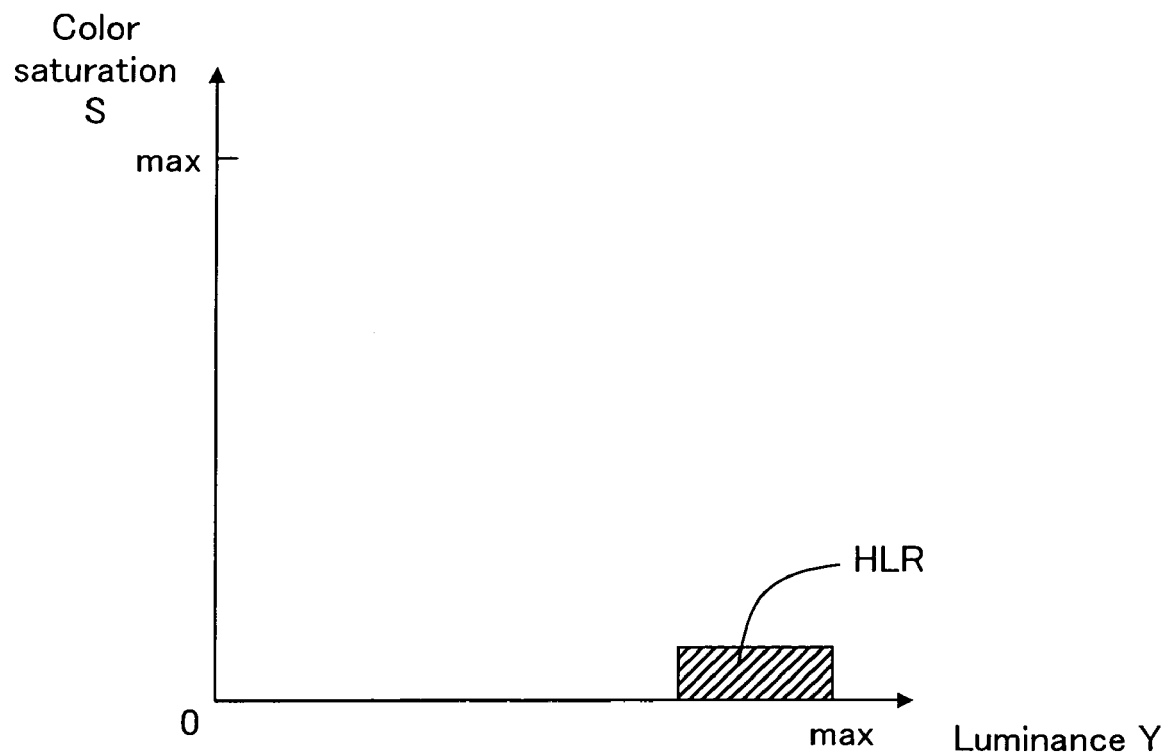
FIG. 5 is a schematic view illustrating one example of a high luminance color range HLR.

The term "high luminance pixels" refers to pixels having a color within a color range, or a high luminance color range, which has low color saturation values and high luminance values. FIG. 5 shows one example of a high luminance color range HLR. Note that various formulas can be used to calculate the luminance Y and the color saturation S of each pixel; for example, the following formulas can be used.

$$Y = 0.587 \times G + 0.114 \times B + 0.299 \times R \quad (1)$$

$$S = \sqrt{(a^{*2} + b^{*2})} \quad (2)$$

In the formula, a* and b* are coordinates in the La*b* color system. The lightness value L, from the La*b* color system, as well as the brightness values or lightness values from other color spaces, can be used as the luminance value Y. Likewise, color saturation values from other color spaces such as the HSL (Hue/Saturation/Luminance) color space, or the HSB (Hue/Saturation/Brightness) color space, can be used for the color saturation value S.

The average color component values CB_ave(R), CB_ave(G) and CB_ave (B) are average values for each of the RGB color components. Furthermore, the average luminance value CB_ave(Y) is the average value for the luminance Y, and to the average hue value CB_ave(H) is the average value for the hue H. The angle of the a* axis in the La*b* color system, or the hue values H from the HSL color space or the HSB color space may, for example, be used for the hue value H.

(2) Skin Color Pixel Ratio Calculation Module 222:

This module 222 calculates the ratio of skin color pixels SPratio, based on the data for the image to be processed Dorg. The ratio of skin color pixels SPratio is given by the following formula (3).

$$SPratio = [\text{skin color pixel count}] / [\text{total pixel count}] \quad (3)$$

Whether or not a given pixel is a skin color pixel is determined according to whether or not the color of that pixel is within a predetermined skin color range. The skin color range can, for example, be determined based on a hue H range and a lightness L range.

(3) Skin Color Pixel Average Pixel Value Calculation Module 224:

This module 224 calculates the average pixel values SC_ave(R), SC_ave(G) and SC_ave(B) for a plurality of skin color pixels, in terms of each of the RGB color components, based on the data for the image to be processed Dorg.

(4) Color Balance Correction Value Calculation Module 226:

This module 226 calculates the color balance correction values $\Delta C(R)$, $\Delta C(G)$ and $\Delta C(B)$ in terms of each of the RGB color components, based on the various values described above. In the present embodiment, the color balance correction values $\Delta C(R)$, $\Delta C(G)$ and $\Delta C(B)$ are calculated according to the following formulas (4a) to (4c).

$$\Delta C(R) = k1 \times \{CB\_ave(Y) - CB\_ave(R)\} + k2 \times \{SC\_target(R) - SC\_ave(R)\} \times SPratio \quad (4a)$$

$$\Delta C(G) = k1 \times \{CB\_ave(Y) - CB\_ave(G)\} + k2 \times \{SC\_target(G) - SC\_ave(G)\} \times SPratio \quad (4b)$$

$$\Delta C(B) = k1 \times \{CB\_ave(Y) - CB\_ave(B)\} + k2 \times \{SC\_target(B) - SC\_ave(B)\} \times SPratio \quad (4c)$$

In the formulas, k1 and k2 are predetermined coefficients. SC_target(R), SC_target(G) and SC_target(B) are skin color target values for each of the color components, and are values determined in advance. As described hereinafter, the values of the coefficients k1 and k2 are, for example, set according to the image to be processed. The methods for setting the coefficients k1 and k2 and the meaning of the color balance correction values $\Delta C(R)$, $\Delta C(G)$ and $\Delta C(B)$ are described hereinafter.

Figure 6:
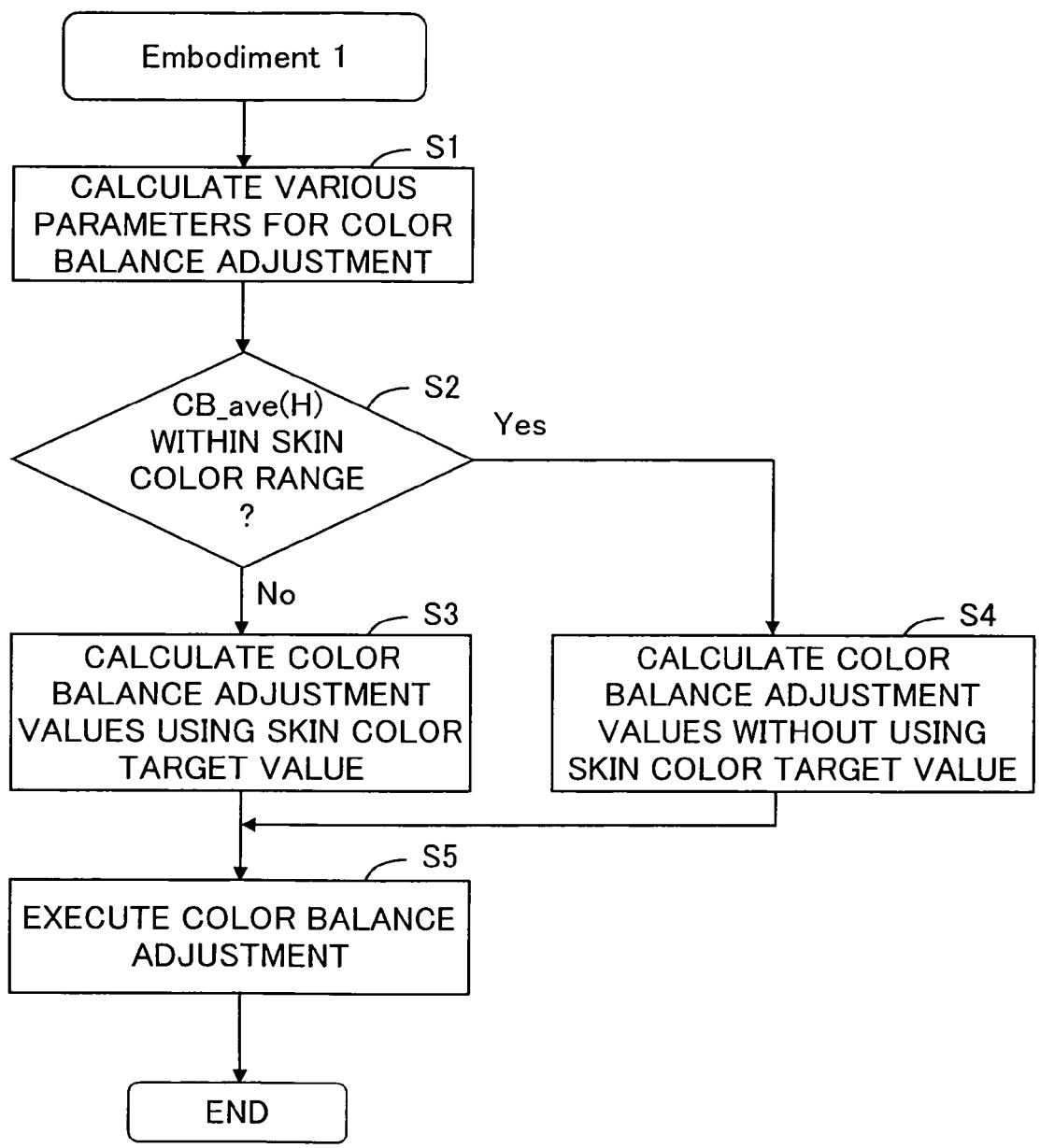
FIG. 6 is a flow chart illustrating the processing procedure for color balance adjustment in a first embodiment.

FIG. 6 is a flow chart illustrating the processing procedure for color balance adjustment in the first embodiment. In Step S1 the various color balance adjustment parameters described above, CB_ave, SPratio, SC_ave except the correction values $\Delta C(R)$, $\Delta C(G)$ and $\Delta C(B)$ are calculated. In Step S2, the color balance correction value calculation module 226 determines whether or not the average hue value for the high luminance pixels CB_ave(H) falls within a predetermined skin color range or skin color hue range. If the average hue value CB_ave(H) does not fall within the skin color range, the color balance correction value calculation module 226 performs computations in a first computation mode for calculating the color balance correction values using the skin color target values SC_target(R), SC_target(G) and SC_target(B) in Step S3. Specifically, the two coefficients k1 and k2 in the formulas (4a) to (4c) above are both set to 1.0, for example. In this case, the formulas (4a) to (4c) above can be rewritten as the following formulas (5a) to (5c).

$$\Delta C(R) = \{CB\_ave(Y) - CB\_ave(R)\} + \{SC\_target(R) - SC\_ave(R)\} \times SPratio \quad (5a)$$

$$\Delta C(G) = \{CB\_ave(Y) - CB\_ave(G)\} + \{SC\_target(G) - SC\_ave(G)\} \times SPratio \quad (5b)$$

$$\Delta C(B) = \{CB\_ave(Y) - CB\_ave(B)\} + \{SC\_target(B) - SC\_ave(B)\} \times SPratio \quad (5c)$$

The first argument on the right-hand side of formulas (5a) to (5c) is the difference between the average luminance value of the high luminance pixels CB_ave(Y) and the average pixel value of the high luminance pixels for each of the color components CB_ave(R), CB_ave(G) and CB_ave(B). This has the effect of bringing the overall color of the image closer to achromatic when the color of the high luminance pixels is shifted from achromatic. The second argument on the right-hand side of formulas (5a) to (5c) multiplies the ratio of skin color pixels SPratio by the difference between the skin color target pixel values SC_target(R), SC_target(G) and SC_target(B) and the average pixel values of the skin color pixels SC_ave(R), SC_ave(G) and SC_ave(B). This second argument has the effect of bringing the average color of pixels having a color close to skin closer to the skin color target value when this is shifted from the skin color target value. Accordingly, if the overall image to be processed is subjected to color balance adjustment using the correction values $\Delta C(R)$, $\Delta C(G)$ and $\Delta C(B)$, which can be given by the formulas (5a) to (5c), it is possible to color balance the entire image to be processed while bringing the skin color pixels closer to the target skin color.

Meanwhile, if it is determined in Step S2 that the average hue value CB_ave(H) falls within the skin color range, the color balance correction value calculation module 226 performs computations in a second computation mode for calculating the color balance correction values without using the skin color target values SC_target(R), SC_target(G) and SC_target(B) in Step S4. Specifically, in formulas (4a) to (4c) above, the first coefficient k1 is set to a predetermined positive number other than zero, and the second coefficient k2 is set to zero. For example, if the coefficient k1 is set to 1.0 and the coefficient k2 is set to zero, the formulas (4a) to (4c) above can be rewritten as the following formulas (6a) to (6c).

$$\Delta C(R) = \{CB\_ave(Y) - CB\_ave(R)\} \quad (6a)$$

$$\Delta C(G) = \{CB\_ave(Y) - CB\_ave(G)\} \quad (6b)$$

$$\Delta C(B) = \{CB\_ave(Y) - CB\_ave(B)\} \quad (6c)$$

As described above, the right-hand argument serves to bring the color of the overall image closer to achromatic when the color of the high luminance pixels is shifted from achromatic, allowing for suitable color balancing of the overall image. Note that the reason for which the coefficient k2 in the second argument on the right-hand side of the formulas (4a) to (4c) is set to zero if it is determined that the average hue value of the high luminance pixels CB_ave(H) falls within the skin color range, is to prevent the correction value from becoming excessively large as a result of the second argument on the right-hand side.

However, the color balance correction values $\Delta C(R)$, $\Delta C(G)$ and $\Delta C(B)$ may be calculated according to formulas (4a) to (4c) or formulas (5a) to (5c), whether or not the average hue value of the high luminance pixels CB_ave(H) falls within the skin color range. In this case, the coefficient k1 in the first argument on the right-hand side may be set to zero.

Figure 7:
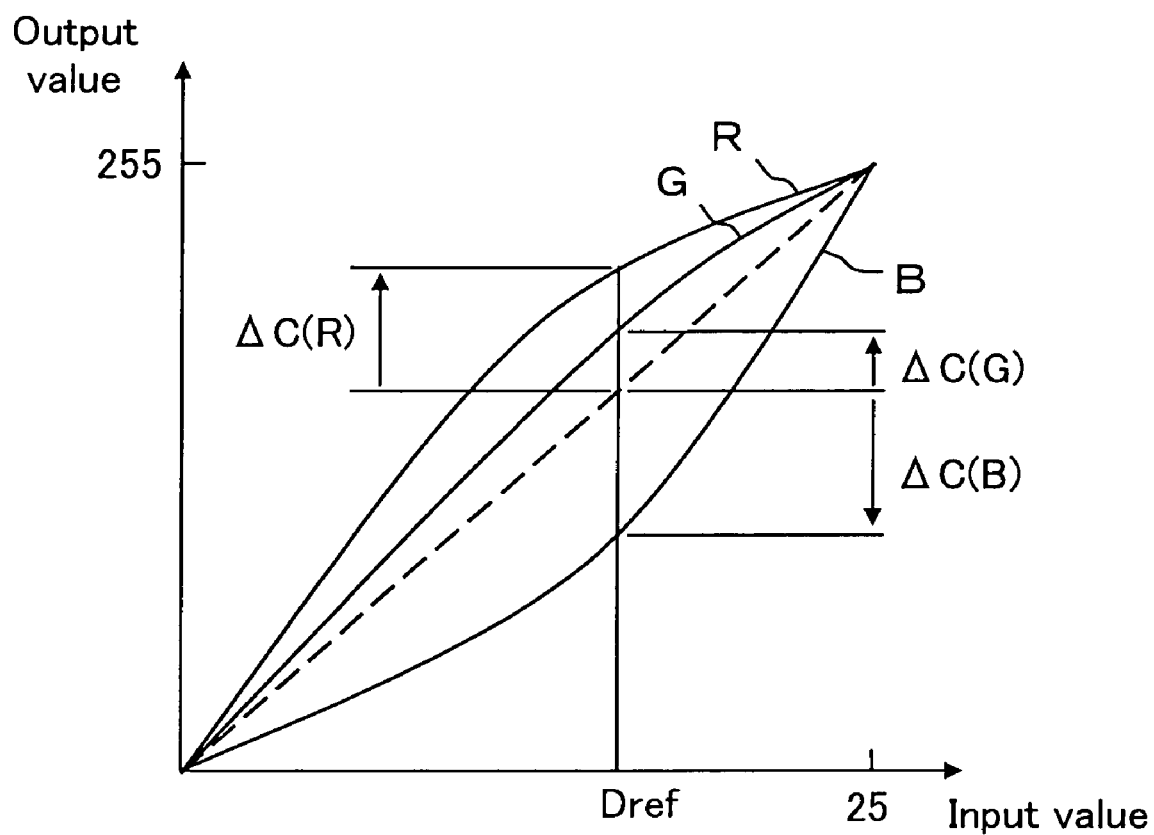
FIG. 7 is the graph illustrating color balance adjustments performed using color balance correction values $\Delta C(R)$, $\Delta C(G)$ and $\Delta C(B)$.

When the color balance correction values $\Delta C(R)$, $\Delta C(G)$ and $\Delta C(B)$ have been calculated, a color balance adjustment execution module 228 executes the color balance adjustment in Step S5 of FIG. 6, so as to generate the corrected image data Dcr (FIG. 3). FIG. 7 is a graph showing the color balance adjustments performed using the correction values $\Delta C(R)$, $\Delta C(G)$ and $\Delta C(B)$. The color balance adjustment is a process whereby gradation correction or tone curve correction is performed for each of the RGB color components in the data for the image to be processed Dorg. The dotted line indicates the original characteristics. The correction values $\Delta C(R)$, $\Delta C(G)$ and $\Delta C(B)$ calculated by the procedure described above, correspond to the amounts by which the output value is shifted from the original characteristics at a reference input value Dref. The average luminance value of the high luminance pixels CB_ave(Y) described above can, for example, be used as the reference input value Dref, or a predetermined constant (for example, 192) can be used. In the example in FIG. 7, the tone curves for each of the color components are determined by specifying the correction values $\Delta C(R)$, $\Delta C(G)$ and $\Delta C(B)$ for each one of the RGB color components with respect to the reference input value Dref. However, other setting methods may be used.

As described above, in the first embodiment, color balance correction values for the image to be processed are determined using the skin color target values, making it possible to mitigate the phenomenon wherein pixels having a desirable skin color are unduly changed by the color balance adjustment.

B. Second Embodiment

Figure 8:
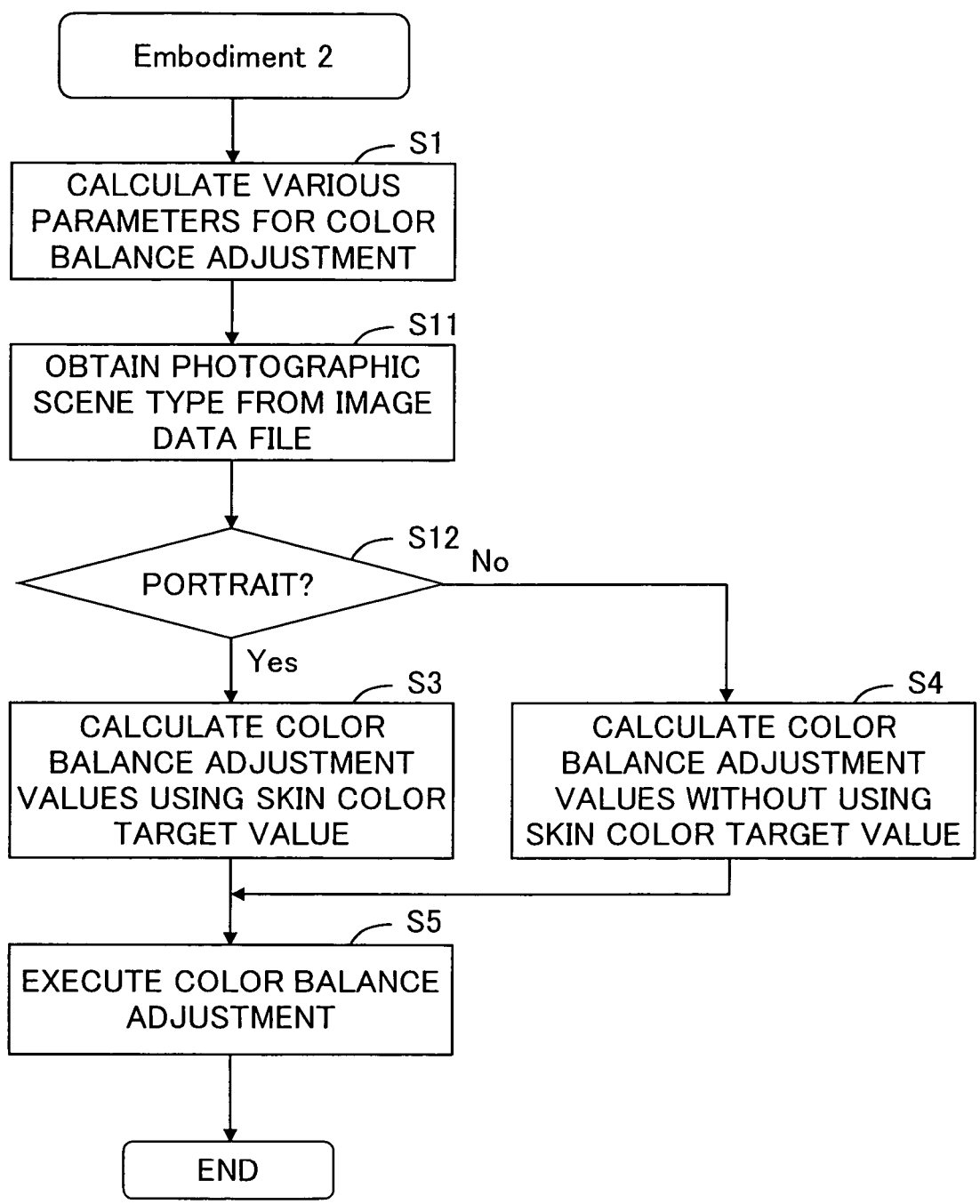
FIG. 8 is a flow chart illustrating the processing procedure for color balance adjustment in a second embodiment.

FIG. 8 is a flow chart illustrating the processing procedure for color balance adjustment in the second embodiment. The only difference with respect to the processing procedure in the first embodiment shown in FIG. 6 is that Step S2 is replaced by two steps S11 and S12, with the exception of which the constitution and operation are the same as those of the first embodiment.

In Step S11 the color balance correction value calculation module 226 obtains the photographic scene type from the image data file MF (FIG. 2). In Step S12, a determination is made as to whether the photographic scene type represents "portrait," and if this does represent "portrait," the color balance correction values are calculated using the skin color target values in Step S3. Meanwhile, if the photographic scene type is not "portrait," the color balance correction values are calculated without using the skin color target values in Step S4.

The photographic scene type is set by the user when taking a photograph with the digital camera 100. Because skin color is emphasized in the photographic scene type of "portrait," it is preferable that the color balance adjustment values be found using the skin color target values in Step S3. Note that whether or not the photographic scene is of a portrait may be determined from information other than the photographic scene type. That is to say, whether or not the photographic scene is of "portrait" may be determined by any information indicating the type of photographic scene in the image (this is referred to as "photographic scene type information").

C. Variants

Note that the present invention is in no way limited to the examples and embodiments described above and can be embodied in various modes without departing from the scope or gist of the invention, wherein the following modifications are, for example, possible.

C1. Variant 1:

In place of the various formulas described above, various methods may be employed to calculate color balance correction values based on the ratio of pixels of a specific color and the average pixel value of the pixels of the specific color. For example, the second argument on the right-hand side of formulas (4a) to (4c) was a method wherein the skin color pixel ratio SPratio is multiplied by the difference between the target pixel values for skin color SC_target(R), SC_target(G) and SC_target(B) and the average pixel values for skin color pixels SC_ave(R), SC_ave(G) and SC_ave(B), but in place of this, methods can be used that include the squares or square roots of these values. However, it is preferable that the color balance correction value have a component that increases with increases in the difference between the target pixel values for skin color SC_target(R), SC_target(G) and SC_target (B) and the average pixel values for skin color pixels SC_ave (R), SC_ave(G) and SC_ave(B), and that increases with increases in the skin color pixel ratio SPratio, as in the second argument on the right-hand side of formulas (4a) to (4c).

Note that, in each of the embodiments described above, a ratio of pixels of a specific color is employed when finding the color balance correction values, but the color balance correction values may be found without employing a ratio of pixels of a specific color. For example, the color balance correction values may be found based on the average pixel values of pixels of a specific color. Furthermore, the color balance correction values may be found based on the average pixel values of pixels of a specific color and the average pixel values of high luminance pixels.

C2. Variant 2:

In each of the embodiments described above, the only image quality adjustment processing performed is color balance adjustment, but various other types of image quality adjustment processing may be performed in addition to this. For example, memory color processing, sharpness enhancement processing and the like may be performed. Note that the memory color processing is processing wherein, only for pixels having a color close to a memory color (specific chromatic color), the color of these pixels is brought closer to its target color.

INDUSTRIAL APPLICABILITY

The present invention is applicable to computers, cameras, image display devices and the like that perform image color balance adjustment.

What is claimed is:

1. An image processing device for adjusting color balance in an image to be processed, comprising:
   a specific color pixel ratio calculation module configured to calculate a ratio of specific color pixels having a color within a first predetermined range in the vicinity of a specific chromatic color, from among all of the pixels present in an image to be processed;
   a specific color pixel average calculation module configured to calculate an average value of pixel values for the specific color pixels;
   a color balance correction value calculation module having a first computation mode for calculating a color balance correction value based on the specific color pixel ratio and the average pixel value for the specific color pixels; and
   a color balance adjustment execution module configured to execute the color balance adjustment for the entirety of the image to be processed, using the color balance correction value.

2. An image processing device recited in claim 1, wherein the color balance correction value calculated in the first computation mode includes a component that increases with increases in a difference between a predetermined specific color target pixel value for the specific chromatic color and the average pixel value for the specific color pixels, and that increases with increases in the specific color pixel ratio.

3. An image processing device recited in claim 1, further comprising:
   a high luminance pixel average pixel value calculation module configured to calculate an average value of pixel values for a plurality of high luminance pixels which have colors in a predetermined second color range having low-color-saturation and high-luminance, among all of the pixels present in the image to be processed,
   the color balance correction value calculation module:
   (i) executing computations in the first computation mode if the average value of hue values of the plurality of high luminance pixels is not within a predetermined range in the vicinity of the specific chromatic color, and
   (ii) executing computations in a second computation mode for calculating the color balance correction value using the average pixel value of the plurality of high luminance pixels, without using the specific color pixel ratio and the average pixel value of the specific color pixels, if the average value of the hue values of the plurality of high luminance pixels is within the predetermined range in the vicinity of the specific chromatic color.

4. An image processing device recited in claim 1, wherein:
   the specific chromatic color is skin color, and
   an image data file representing the image to be processed includes photographic scene type information representing a type of photographic scene in the image to be processed;
   the color balance adjustment execution module:
   (i) executing computations in the first computation mode if the photographic scene type information indicates portrait;
   (ii) executing computations in a second computation mode for calculating the color balance correction value using the average pixel value of the plurality of high luminance pixels, without using the specific color pixel ratio and the average pixel value of the specific color pixels, if the photographic scene type information indicates a scene other than portrait.

5. An image processing method for adjusting color balance in an image to be processed, the image processing method comprising the steps of:
   (a) calculating a ratio of specific color pixels having a color within a first predetermined range in the vicinity of a specific chromatic color, from among all of the pixels present in an image to be processed;
   (b) calculating an average value of pixel values for the specific color pixels;
   (c) calculating a color balance correction value to be used in color balance adjustment; and
   (d) executing the color balance adjustment for the entirety of the image to be processed, using the color balance correction value,
   wherein the step (c) includes a step of executing computations in a first computation mode for calculating a color balance correction value based on the specific color pixel ratio and the average pixel value for the specific value pixels.

6. A computer program, stored on a computer readable electronic storage medium, for adjusting color balance in an image to be processed, the computer program causing a computer to implement:
   a specific color pixel ratio calculation function for calculating a ratio of specific color pixels having a color within a first predetermined range in the vicinity of a specific chromatic color, from among all of the pixels present in an image to be processed;
   a specific color pixel average calculation function, for calculating an average value of pixel values for the specific color pixels;

a color balance correction value calculation function having a first computation mode for calculating a color balance correction value based on the specific color pixel ratio and the average pixel value for the specific color pixels; and a color balance adjustment execution function for executing the color balance adjustment for the entirety of the image to be processed, using the color balance correction value.

7. An image processing device for adjusting color balance in an image to be processed, comprising:

a specific color pixel average calculation module for calculating an average value for pixel values of specific color pixels having a color within a first predetermined range in the vicinity of a specific chromatic color, from among all of the pixels present in the image to be processed;

a color balance correction value calculation module having a first computation mode for calculating a color value correction value based on the average pixel value of the specific color pixels; and a color balance adjustment execution module configured to execute the color balance adjustment for the entirety of the image to be processed, using the color balance correction value.

8. An image processing device recited in claim 7, wherein the color balance correction value calculated in the first computation mode includes a component that increases with increases in a difference between a predetermined specific color target pixel value for the specific chromatic color and the average pixel value of the specific color pixels.

9. An image processing device recited in claim 7, further comprising:

a high luminance pixel average pixel value calculation module configured to calculate an average value of pixel values for a plurality of high luminance pixels which have colors in a predetermined second color range having low-color-saturation and high-luminance, among all of the pixels present in the image to be processed, the color balance correction value calculation module:
  (i) executing computations in the first computation mode if the average value of hue values of the plurality of high luminance pixels is not within a predetermined range in the vicinity of the specific chromatic color, and
  (ii) executing computations in a second computation mode for calculating the color balance correction value using the average pixel value of the plurality of high luminance pixels, without using the average pixel value of the specific color pixels, if the average value of the hue values of the plurality of high luminance pixels is within the predetermined range in the vicinity of the specific chromatic color.

10. An image processing device recited in claim 7, wherein:

the specific chromatic color is skin color;

an image data file representing the image to be processed includes photographic scene type information representing a type of photographic scene in the image to be processed;

the color balance adjustment execution module:
  (i) executing computations in the first computation mode if the photographic scene type information indicates portrait; and
  (ii) executing computations in a second computation mode for calculating the color balance correction value using the average pixel value of the plurality of high luminance pixels, without using the average pixel value of the specific color pixels, if the photographic scene type information indicates a scene other than portrait.

* * * * *